Nov. 10, 1959  A. MOLLER  2,912,065
LUBRICATION ARRANGEMENT
Filed Feb. 17, 1958
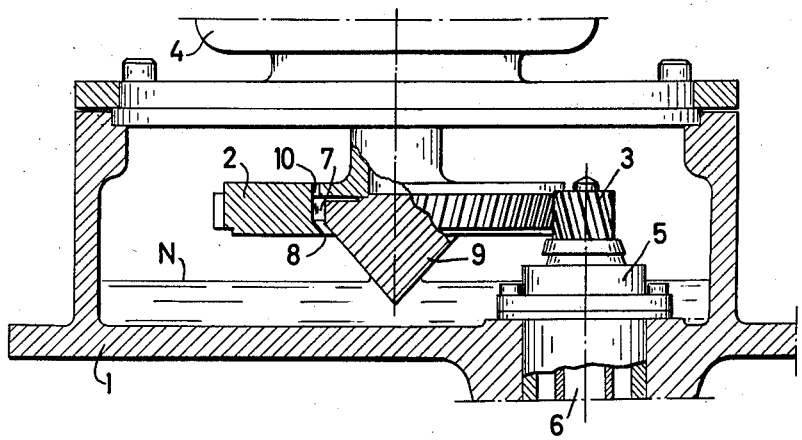
Aage MØLLER
INVENTOR
By
Wenderoth, Lind & Ponack
Attys

2,912,065

LUBRICATION ARRANGEMENT

Aage Moller, Farum, Denmark, assignor to Aktieselskabet Niro Atomizer, Hellerup, Denmark Application February 17, 1958, Serial No. 715,763

Claims priority, application Denmark February 25, 1957

4 Claims. (Cl. 184—13)

The invention relates to a lubrication arrangement of the type where a rotary member conveys oil from an oil reservoir to a point of lubrication.

As examples of lubrication arrangements of the type referred to there should be mentioned ring lubrication arrangements and splash lubrication arrangements. Ring lubrication is applicable only in the case of horizontal shafts, and splash lubrication can only with difficulty be applied to vertical shafts.

The purpose of the invention is to provide a lubrication arrangement of the said type which is well suited for lubrication in connection with substantially vertically mounted shafts and where an extremely effective lubrication can be attained by simple means.

According to the invention, this is attained by the rotary member being shaped as a body of revolution which is mounted on a substantially vertical shaft and has a diameter increasing from the bottom upwards, the lower end of said body being immersed in the oil in the reservoir. Concentrically with the said body a member provided with an oil-catching edge surrounds the body a short distance below a plane through the largest radius of the body, from which oil-catching member the oil can flow to the point of lubrication.

Due to the surface tension in the oil, the latter will rise a short distance along the surface of the body immersed in the oil, and due to the rotation of the body the centrifugal force causes the quantity of oil located on the surface above the oil level in the reservoir to be flung out in the direction towards a larger radius. Due to the adhesion to the surface of the body the oil is not really flung out but is moved along the surface in the direction of increasing diameter, i.e. upwards. When the oil reaches the level where the rotary body has its largest radius, it is flung off the body, and the oil thus flung off is caught by the said oil-catching member, the said oil-catching edge contributing to preventing the oil from being flung out of the member or dripping from the latter.

It is obvious that the construction referred to is exceedingly simple, and experiments have proved that with such an arrangement it is possible to attain an extremely effective lubrication. As a matter of fact it is possible to convey even very great quantities of oil per time unit, sufficient not only for ensuring the necessary lubrication, but also the cooling often required in the case of very fast-running gear wheels.

The quantity of oil conveyed depends on the shape and rate of revolution of the said body which thus can be adapted to the conditions prevailing in each individual case. The quantity of oil conveyed furthermore depends on the radius of the body at the level of the surface in the oil reservoir, and it is therefore possible to regulate the quantity of oil conveyed by regulating the oil level in the reservoir, so that the oil surface is moved to a point with a larger or smaller radius of the said body of revolution dependent on the regulation desired.

In the following the invention will be further explained with reference to the drawing which diagrammatically and partly in vertical axial section shows a gear wheel transmission with an embodiment of the lubrication arrangement according to the invention.

In the drawing, 1 designates a case in which a gear wheel transmission is mounted comprising two gear wheels 2 and 3. The gear wheel 2 is secured on the shaft of an electric motor 4 mounted on top of the case 1, while the gear wheel 3 is secured on a shaft 6 journalled in a bearing 5, the said shaft 6 serving for driving an apparatus not shown, e.g. a rotary atomizer of the kind used in plants for the production of dried powders.

The bottom of the case 1 serves as oil reservoir, and the level N of the oil is indicated by a dot-and-dash line.

In the underside the gear wheel 2 has a concentrically placed, substantially cylindrical recess 7 which, however, at its lower part is conical for forming an oil-catching edge 8. In this recess 7, a conical body 9 is secured, the tip of which is immersed somewhat in the oil, and the conical surface of which continues some distance above the oil-catching edge 8. The largest diameter of the body 9 is only slightly smaller than the internal diameter at the oil-catching edge 8, but, incidentally, the difference in diameters at the two points is not critical, the only requirement being that there is sufficient room for mounting the conical body 9 in its place coaxially with the gear wheel 2 in the recess 7 of the latter.

The gear wheel 2 is furthermore provided with a number of holes, of which only a single hole designated by 10 is shown on the drawing. These holes are located along the circumference of the recess 7 and lead from this recess 7 through the body of the gear wheel 2 up to the surface of the latter.

The said holes 10 lie outside a circle having a diameter equal to the smallest diameter of the oil-catching edge 8.

The lubrication arrangement shown functions in the following way.

As the conical body 10 is partly immersed in the oil, the oil will, due to the surface tension at the boundary surface, rise slightly along the portion of the surface of the conical body 9 located above the oil level. This quantity of oil will, due to the rapid rotation of the body, be subject to heavy centrifugal forces. The oil is, however, also subject to the forces of adherence to the conical surface, and the resultant forces will, consequently, make the oil move upwards along the surface of the conical body up to the level where it has its largest diameter. This level being located above the oil-catching edge 8, the oil will from here be flung over towards the lower edge of the wall of the recess 7. As the gear wheel 2 also rotates at a very high speed, the oil will due to the effect of the centrifugal force spread over the wall in the recess 7, and as the holes 10 lie on a larger diameter than the smallest diameter of the oil-catching edge 8, the oil will be led up through the holes 10, but not to any substantial degree beyond the edge 8. From the holes 10 the oil spreads across the surface of the gear wheel 2 and out to the teeth of the latter, and as the arrangement described is able to provide an exceptionally ample supply of oil, an effective lubrication as well as the necessary cooling of the gear wheels are ensured.

The invention is not limited to the embodiment described above and shown on the drawing. Instead of a conical body, a body of revolution of any suitable shape with upwardly increasing diameters can be used.

Furthermore, the invention is not limited to application in connection with a gear-wheel transmission or a similar transmission, but may be used in all cases where a vertical rotary shaft is located or can be mounted in the vicinity of a point of lubrication or a point from which the oil can be conveyed to a point of lubrication in a simple way.

I claim:

1. A lubrication arrangement for the lubrication of a gear, comprising a gear-wheel, a vertical shaft on which said gear wheel is mounted, means for the rotation of said shaft, an oil-conveying member having the shape of a body of revolution on said shaft, the diameter of which increases from the bottom upwards and the axis of which coincides with that of said shaft, an oil reservoir embracing the lower end of said member, said gear having an oil-catching edge depending therefrom and surrounding said oil-conveying member at a level above said oil reservoir, a narrow space being present between said oil-catching edge and said oil-conveying member, and duct means leading from the space between said oil-catching edge and said gear wheel to the top surface of said gear wheel.

2. A lubrication arrangement for the lubrication of a gear, comprising a gear wheel, a vertical shaft on which said gear wheel is mounted, said gear wheel having a downwardly facing cylindrical recess coaxial with said shaft, an inwardly projecting flange being provided at the lower circumference of said recess, an oil-conveying member being secured to said gear wheel in said recess concentric with said shaft, said oil-conveying member having the shape of a body of revolution, the diameter of which increases from the bottom upwards and the axis of which coincides with that of said shaft, an oil reservoir embracing the lower end of said member, a narrow space being present between said flange and said oil-conveying member, said gear wheel having holes connecting the top-surface of said gear wheel and said lower side of said gear wheel within the range of said recess in the vicinity of the circumference thereof.

3. A lubrication arrangement as claimed in claim 2, said oil-conveying member being conical.

4. A lubrication arrangement comprising a rotating member, a vertical shaft on which said rotating member is mounted, means for the rotation of said shaft, an oil-conveying member having the shape of a body of revolution on said shaft, the diameter of which increases from the bottom upwards and the axis of which coincides with that of said shaft, an oil reservoir embracing the lower end of said oil conveying member, said rotating member having an oil-catching edge depending therefrom and surrounding said oil-conveying member at a level above said oil reservoir, a narrow space being present between said oil-catching edge and said oil-conveying member, and duct means leading from the space between said oil-catching edge and said rotating member to the top surface of said rotating member.

References Cited in the file of this patent

UNITED STATES PATENTS

| | | |
|---|---|---|
| 1,372,801 | David | Mar. 29, 1921 |
| 2,224,255 | De Laval-Crow | Dec. 10, 1940 |